Patented Apr. 10, 1951

2,548,764

UNITED STATES PATENT OFFICE 2,548,764

CHLORINATION OF HYDROCARBONS

George W. Ayers, Chicago, Ill., and Erskine E. Harton, Jr., Alexandria, Va., assignors to The Pure Oil Company, Chicago, Ill., a corporation of Ohio No Drawing. Application September 24, 1945, Serial No. 618,423

10 Claims. (Cl. 260—659)

This invention relates to a method of chlorinating saturated hydrocarbons containing a tertiary carbon atom and more particularly to a method for separating saturated hydrocarbons which do not contain a tertiary carbon atom from other hydrocarbons. This application is a continuation-in-part of application Serial No. 474,748, now Patent No. 2,418,814, issued April 15, 1947.

An object of the invention is to selectively chlorinate saturated hydrocarbons containing a tertiary carbon atom in a mixture containing saturated hydrocarbons which do not contain a tertiary carbon atom.

Another object of our invention is to obtain saturated hydrocarbons not containing tertiary carbon atoms from an admixture containing saturated hydrocarbons of substantially the same boiling point containing tertiary carbon atoms.

Still another object of the invention is to provide a method for chlorinating hydrocarbons containing a tertiary carbon atom at or about atmospheric temperature.

A still further object of the invention is to provide catalysts which accelerate the rate of chlorination of saturated hydrocarbons containing tertiary carbon atoms.

Other objects of the invention will become apparent from the following description.

We have found that certain metal nitrates and nitrites not only greatly accelerate the rate of chlorination of saturated hydrocarbons containing tertiary carbon atoms, but that within an effective temperature range of approximately 70° to 150° F. the rate of chlorination of saturated hydrocarbons containing tertiary carbon atoms is greatly accelerated without materially accelerating the rate of chlorination of saturated hydrocarbons not containing a tertiary carbon atom. The metal nitrates and nitrites which are effective as catalysts are those which are capable of reacting slowly with chlorine under reaction conditions to form nitrosyl chloride.

Among those nitrates and nitrites which we have found to be particularly effective are uranyl, mercurous, mercuric, zirconium, thorium, cerium, zinc, copper, cadmium and calcium nitrates and nitrites. Thallium and cobalt nitrates and nitrities also exhibit a high degree of selectivity, but their ability to accelerate the chlorination of hydrocarbons containing a tertiary carbon atom is not as pronounced as the previously mentioned nitrates and nitrites.

In accordance with our invention a mixture of hydrocarbons containing open chain paraffins and/or cycloparaffins not containing a tertiary carbon atom, such as normal heptane and cyclohexane, and also containing isoparaffins and/or alkylated cycloparaffins containing a tertiary carbon atom such as iso-octane and methyl cyclohexane, is preferably dissolved in a solvent which is substantially inert to the chlorinating agent. Although the use of a solvent is not necessary, it is preferred. Where a solvent is not used very high mol ratios of hydrocarbon to chlorinating agent must be used to obtain good selectivity of chlorination. The ratio of hydrocarbon plus solvent to chlorinating agent should be at least 8 to 1 in order to get good selectivity of chlorination and also to avoid explosive mixtures. As solvents may be used nitrobenzene and organic chlorine containing compounds such as chloroform, carbon tetrachloride, acetylene tetrachloride, hexachlorethane, and others. For best results the volume of solvent used should be at least equal in volume to the hydrocarbon mixture. The volume of solvent to hydrocarbon may be maintained as high as 10 to 1, or more.

As chlorinating agents for use in carrying out our process any mild chlorinating agent may be used, such as antimony pentachloride, sulfuryl chloride, or even chlorine gas when used in such manner that its concentration in the reaction mixture is sufficiently low. The chlorinating agent may be added to the hydrocarbon mixture to be chlorinated either continuously or batchwise, care being taken to maintain mol ratio of hydrocarbon plus solvent to chlorinating agent in the mixture above 8 to 1.

Although the temperature at which chlorination is effected may range from approximately 70° to 150° F., we prefer to maintain the temperature at approximately 70° to 90° F., since the selective action of the chlorinating agent is most pronounced within this temperature range.

Although it is not necessary to have the mixture absolutely dry during the chlorination reaction, we prefer to maintain the mixture dry for the reason that the chlorination reaction proceeds more rapidly in most cases in a dry environment than when moisture is present. As drying agents phosphorus pentoxide, sodium sulfate, and others, may be used. A very small quantity of drying agent is sufficient, as for example 0.5 pound, or less, per 100 pounds of solution to be chlorinated. Care should be exercised not to use alumina as drying agent in the presence of a chlorinating agent, since aluminum chloride forms and aluminum chloride is a non-selective chlorinating catalyst.

The time required for chlorination of substantially all the isoparaffins, or other saturated hydrocarbons containing a tertiary carbon atom will vary from approximately 4 to 20 hours, at a temperature of 70° to 90° F. when using dilute solutions of the hydrocarbons and high mol ratios of hydrocarbon to chlorinating agent. Longer periods of contact result in partial chlorination of the non-tertiary carbon atom hydrocarbons. Increasing the temperature decreases the time required for chlorination, but also results in less selective chlorination. Likewise, the higher the ratio of the chlorinating agent to hydrocarbon present, the less the selectivity. The mixture to be chlorinated may be preliminarily treated to remove aromatic and unsaturated hydrocarbons. This may be done either by treatment with 100% sulfuric acid at room temperature; or by treatment with 100% sulfuric acid at temperatures of 32° to 40° F. followed by three successive treatments with 95% to 98% of sulfuric acid at approximately the same temperature using one to two parts of acid to one part of hydrocarbon mixture; or the aromatic, olefin and other unsaturated hydrocarbons may be removed by a preliminary chlorination step at approximately normal atmospheric temperature in the absence of the catalyst. These hydrocarbons are readily chlorinated before chlorination of the saturated hydrocarbons takes place. In the event that it is not required to obtain substantially pure chlorinated hydrocarbons it is not necessary to remove the aromatic and other unsaturated hydrocarbons as a preliminary step, since these hydrocarbons will be chlorinated together with the isoparaffins and alkylated cycloparaffins.

Where the process is carried out for the purpose of separating iso-hydrocarbons, that is saturated hydrocarbons containing a tertiary carbon atom, from other saturated hydrocarbons, the mixture treated should be a narrow-boiling fraction, preferably a fraction having a boiling range not exceeding 50° to 75° F., in order that the non-chlorinated hydrocarbons may be separated from the chlorinated hydrocarbons by distillation.

The process should be carried out in apparatus constructed of materials which are immune to attack by chlorine. Steel, aluminum and carbon surfaces should be avoided since ferric chloride, aluminum chloride, charcoal, and other forms of carbon are non-selective chlorination catalysts. Apparatus lined with glass or ceramic material is suitable.

In order to demonstrate the effect of various metal nitrates in catalyzing the chlorination of saturated hydrocarbons containing a tertiary carbon atom, and saturated hydrocarbons not containing a tertiary carbon atom, a number of tests were made on normal heptane and iso-octane. The tests were all carried out at temperatures of 70° to 80° F. and the chlorinating agent used was antimony pentachloride. A mixture of the hydrocarbon to be tested in the amount of 10 mols to one mol of catalyst, 6 mols of phosphorus pentoxide, 50 mols of antimony pentachloride and 1180 mols of chloroform was used in each test, except those tests marked with an asterisk in which the ratio of reaction was 2 mols of hydrocarbon, one mol of catalyst, 6 mols of phosphorus pentoxide, 48 mols of antimony pentachloride and 600 mols of chloroform. The mixtures were allowed to stand for 18 hours and then analyzed to determine the amount of chlorine that reacted. The figures given in the table represent the number of atoms of hydrogen replaced by chlorine per molecule of hydrocarbon.

*Table I*

| Compound | Normal Heptane | | Iso-Octane | |
| --- | --- | --- | --- | --- |
| | With $P_2O_5$ | Without $P_2O_5$ | With $P_2O_5$ | Without $P_2O_5$ |
| Uranyl Nitrate | 0.1 | 0.05 | 1.5 | 0.8 |
| Uranyl Nitrate (dried) | 0.25 | 0.1 | 2.6 | 0.8 |
| Mercurous Nitrate (normal) | 0.09 | 0.04 | 1.6 | 0.9 |
| Mercuric Nitrate | 0.06 | 0.03 | 1.5 | 1.7 |
| Zirconium Nitrate (dried) | 0.2 | 0.06 | 2.2 | 0.8 |
| Thorium Nitrate | 0.07 | 0.03 | 1.7 | 1.6 |
| Cerium Nitrate | 0.3 | 0.2 | 2.4 | 3.3 |
| Zinc Nitrate (dried) | 0.1 | 0.2 | 2.7 | 0.4 |
| Copper Nitrate (dried) | 0.3 | 0.1 | 2.7 | 1.4 |
| Cadmium Nitrate (dried) | 0.2 | 0.1 | 2.6 | 0.4 |
| Calcium Nitrate (dried) | 0.3 | 0.1 | 3.0 | 0.3 |
| Cobalt Nitrate* | 0.0 | | 0.5 | |
| Thallium Nitrate* | 0.02 | | 0.3 | |
| Lead Nitrate* | 0.02 | | 0.1 | |
| Barium Nitrate* | 0.03 | | 0.1 | |
| Strontium Nitrate* | 0.03 | | 0.04 | |
| Sodium Nitrate* | 0.01 | | 0.1 | |
| Potassium Nitrate | 0.5 | 0.2 | 1.9 | 0.7 |
| Chromium Nitrate | 0.5 | 0.1 | 2.2 | 0.7 |
| None* | 0.01 | | 0.02 | |

It is apparent from the table that the nitrates down to and including thallium nitrate were highly selective in their ability to chlorinate iso-octane as compared with their ability to chlorinate normal heptane. The remaining nitrates, although selective to some degree, were not sufficiently active to have any practical utility for the purpose of this invention. It is also apparent that the selectivity of the catalyst is good whether in the presence or absence of phosphorus pentoxide, but that the activity of the catalyst is greater in the presence of phosphorus pentoxide with the exception of mercuric and cerium nitrates.

Another series of tests was made to determine the effect of various nitrates on the chlorination of various saturated hydrocarbons. In this series of tests the reaction conditions of time and temperature were the same as for the tests reported in Table I. The ratio of the reactants was 2 mols of hydrocarbon, one mol of catalyst, 6 mols of phosphorus pentoxide, 48 mols of antimony pentachloride and 600 mols of chloroform. The figures appearing in the table represent the atoms of hydrogen replaced by chlorine per molecule of hydrocarbon, with the exception of the tests marked with an asterisk in which 10 mols of hydrocarbon, one mol of catalyst, 6 mols of phosphorus pentoxide, 50 mols of antimony pentachloride and 1180 mols of chloroform were used.

*Table II*

| Catalyst Used | No. Catalyst, Without P₂O₅ | Uranyl Nitrate | | Mercurous Nitrate | | Thorium Nitrate | | Cerium Nitrate, With P₂O₅ |
|---|---|---|---|---|---|---|---|---|
| | | Without P₂O₅ | With P₂O₅ | Without P₂O₅ | With P₂O₅ | Without P₂O₅ | With P₂O₅ | |
| n-Pentane | 0.03 | 0.05 | 0.05 | 0 | | 0 | | 0 |
| n-Octane | 0.06 | 0.08 | 0.02 | 0.06 | | 0 | | 0 |
| iso-Pentane | 0.4 | 1.5 | 3.7 | 3.4 | 3.5 | 3.4 | 3.7 | 4.0 |
| iso-Octane | 0.2 | 2.8 | | | 2.6 | | 2.1 | |
| Neohexane | 0.1 | 0.2 | 0.3 | 0.1 | 0.2 | 0 | 0.2 | 0.2 |
| Ethylcyclohexane | 0.06 | 0.04 | 4.7 | 4.8 | | 4.5 | | 4.8 |
| Triptane | 2.7 | 1.5 | 3.5 | 1.6 | 4.1 | 1.7 | 3.4 | 1.6 |
| Cyclohexane | | | | | | 0 | | 0 |
| 2-Methylpentane | | | | | 5.0 | | 4.7 | |
| Methylcyclohexane | | | | | 4.9 | | 4.8 | |
| Decalin | | | | | 6.3 | | | |
| 2,3-Dimethylpentane* | | | *3.9 | | | | | |
| 2,4-Dimethylpentane* | | | *3.9 | | | | | |

It is apparent from the results in Table II that saturated hydrocarbons not containing a tertiary carbon atom, such as normal pentane, normal octane, neohexane and cyclohexane, show very little, if any, increase in the amount of chlorination in the presence of the various nitrate catalysts. On the other hand, the hydrocarbons having a tertiary carbon atom, such as isopentane, iso-octane and methylcyclohexane, show a marked increase in chlorination in the presence of the catalyst.

In order to demonstrate the selectivity of catalysts in accordance with our invention when used with a mixture of hydrocarbons, three mixtures were prepared and chlorinated with antimony pentachloride in the presence of phosphorus pentoxide in chloroform solution using uranyl nitrate as catalyst. The amount of isoparaffin in the mixture was determined in accordance with the modified Moldavskii method described in application Serial No. 474,748. The composition of the three mixtures with the isoparaffin content determined by analysis is given in Table III:

*Table III*

| Composition of mixture (per cent by volume) | Per cent Iso-paraffin in mixture | Per cent Iso-paraffin found by analysis |
|---|---|---|
| Mixture I: 35% n-heptane, 35% iso-octane, 15% di-isobutylene, 15% benzene | 35 | 34.6 |
| Mixture II: 32.5% n-heptane, 30% iso-octane, 15% benzene, 22.5% cyclohexene | 30 | 33.8 |
| Mixture III: 32% n-heptane, 24% iso-octane, 20% cyclohexene, 24% benzene | 24 | 29.2 |

The fact that the isoparaffin content as found by analysis is so close to the known isoparaffin content of the mixture shows that the chlorination of the isoparaffins was highly selective.

It will be seen, therefore, that we have discovered a method for chlorinating hydrocarbons having a tertiary carbon atom in admixtures containing other saturated hydrocarbons without substantial chlorination of the other saturated hydrocarbons so that separation of the two can be effected.

It is claimed:
1. The method of chlorinating saturated hydrocarbons containing a tertiary carbon atom at approximately atmospheric temperature comprising contacting said hydrocarbons with a chlorinating agent in the presence of a compound selected from the group consisting of nitrosyl chloride and metal nitrates and nitrites, excepting uranium salts, capable of reacting with chlorine under reaction conditions to form nitrosyl chloride.

2. The method of chlorinating saturated hydrocarbons having a tertiary carbon atom without chlorinating saturated hydrocarbons not having a tertiary carbon atom in a mixture of said hydrocarbons comprising chlorinating said mixture at a temperature of approximately 70° to 150° F. in the presence of a compound selected from the group consisting of nitrosyl chloride and metal nitrates, excepting uranium salts, and nitrites capable of reacting with chlorine under reaction conditions to form nitrosyl chloride.

3. Method in accordance with claim 2 in which the chlorinating agent is antimony pentachloride.

4. The method of selectively chlorinating saturated hydrocarbons having a tertiary carbon atom in a mixture containing saturated hydrocarbons not containing a tertiary carbon atom comprising reacting said mixture with antimony pentachloride at temperatures of approximately 70° to 90° F. in the presence of a catalyst selected from the group consisting of nitrosyl chloride and metal nitrates and nitrites, excepting uranium salts, capable of reacting with chlorine under reaction conditions to form nitrosyl chloride the mol ratio of hydrocarbon to antimony pentachloride in the mixture being not less than 8 to 1 and the time of contact between hydrocarbons and antimony pentachloride being sufficient to chlorinate substantially the entire content of tertiary carbon atom hydrocarbons and insufficient to chlorinate the non-tertiary carbon atom hydrocarbons to any substantial extent.

5. Method in accordance with claim 4 in which the chlorination is effected in the presence of a solvent inert to chlorination under reaction conditions.

6. Method in accordance with claim 4 in which the catalyst is a nitrate of mercury.

7. Method in accordance with claim 4 in which the catalyst is thorium nitrate.

8. Method in accordance with claim 4 in which the catalyst is cerium nitrate.

9. Method in accordance with claim 4 in which the catalyst is zirconium nitrate.

10. Method in accordance with claim 4 in which the reaction is carried out in the presence of phosphorus pentoxide and the catalyst is zinc nitrate.

GEORGE W. AYERS.
ERSKINE E. HARTON, JR.

REFERENCES CITED

The following references are of record in the file of this patent:

UNITED STATES PATENTS

| Number | Name | Date |
|---|---|---|
| 1,677,831 | Krause | July 17, 1928 |
| 2,418,814 | Ayers et al. | Apr. 15, 1947 |

OTHER REFERENCES

Egloff et al.: "Isomerization of Pure Hydrocarbons"; pages 407–419 (1942).